United States Patent
Allmendinger et al.

(10) Patent No.: US 9,995,598 B2
(45) Date of Patent: Jun. 12, 2018

(54) METHOD FOR MEASURING A POSITION

(75) Inventors: Frank Allmendinger, Stuttgart (DE); Eberhard Binder, Ditzingen (DE)

(73) Assignee: Marquardt Mechatronik GmbH, Rietheim-Weilheim (DE)

( * ) Notice: Subject to any disclaimer, the term of this patent is extended or adjusted under 35 U.S.C. 154(b) by 706 days.

(21) Appl. No.: 13/569,403

(22) Filed: Aug. 8, 2012

(65) Prior Publication Data

US 2013/0024147 A1 Jan. 24, 2013

Related U.S. Application Data

(63) Continuation of application No. PCT/EP2011/000624, filed on Feb. 10, 2011.

(30) Foreign Application Priority Data

Feb. 12, 2010 (DE) .................. 10 2010 007 915

(51) Int. Cl.
*G01R 25/00* (2006.01)
*G01D 5/14* (2006.01)

(52) U.S. Cl.
CPC .................................. *G01D 5/145* (2013.01)

(58) Field of Classification Search
CPC ...................................................... G01R 33/00
(Continued)

(56) References Cited

U.S. PATENT DOCUMENTS 4,622,644 A * 11/1986 Hansen ........................ 702/153
4,684,890 A * 8/1987 Briguet et al. ............... 324/309
(Continued)

FOREIGN PATENT DOCUMENTS

DE 103 07 580 B3 6/2004
DE 10 2005 009 381 A1 9/2006
(Continued)

OTHER PUBLICATIONS

Eduardo A. Lima (Obtaining vector magnetic field maps from single-component measurements of geological samples), Journal of Geophysical Research, vol. 114, B06102, doi:10.1029/2008JB006006, 2009.*
(Continued)

*Primary Examiner* — Aditya Bhat
(74) *Attorney, Agent, or Firm* — Burr & Brown, PLLC

(57) ABSTRACT

A method for measuring a position using a magnet and a sensor for detecting the magnetic field strength of the magnet. The magnet and/or the sensor interact with a movable element so that a relative movement between the sensor and the magnet can be effected. The position of the movable element in accordance with the coordinates in a system of coordinates can be ascertained on the basis of the magnetic field having a predetermined shape generated by the magnet and detected by the sensor. The sensor ascertains three linearly independent spatial direction components of the magnetic field strength of the magnetic field acting at the location of the sensor. Each coordinate along a coordinate axis of the system coordinates of the magnetic field is determined individually and unambiguously by the combination of the three linearly independent spatial direction components of the magnetic field strength detected by the sensor.

20 Claims, 3 Drawing Sheets

(58) Field of Classification Search
USPC ............ 327/207.13, 207.16, 207.22, 207.23, 327/207.24, 207.25, 202, 225, 228, 232; 342/386, 448, 450
See application file for complete search history.

(56) References Cited

U.S. PATENT DOCUMENTS

| | | | | |
|---|---|---|---|---|
| 5,453,689 | A | * | 9/1995 | Goldfine et al. ............... 324/239 |
| 5,530,345 | A | * | 6/1996 | Murari et al. ............. 324/207.2 |
| 5,640,170 | A | | 6/1997 | Anderson |
| 5,783,944 | A | * | 7/1998 | Rakijas ........................ 324/244 |
| 6,225,887 | B1 | * | 5/2001 | Jensen et al. ................. 335/306 |
| 6,956,366 | B2 | * | 10/2005 | Butzmann ................ 324/207.21 |
| 6,993,443 | B2 | | 1/2006 | Harle |
| 7,286,034 | B2 | * | 10/2007 | Creighton .................... 335/302 |
| 7,382,129 | B2 | * | 6/2008 | Mills ............................ 324/318 |
| 7,696,748 | B2 | * | 4/2010 | Schlicker et al. ............ 324/240 |
| 8,103,484 | B2 | * | 1/2012 | Ravnikar et al. .................. 703/1 |
| 8,117,150 | B1 | * | 2/2012 | Avera ............................ 706/62 |
| 8,422,825 | B1 | * | 4/2013 | Neophytou et al. .......... 382/294 |
| 8,433,548 | B2 | * | 4/2013 | Merlhiot ........................... 703/6 |
| 8,450,997 | B2 | * | 5/2013 | Silverman ................ 324/207.15 |
| 8,797,024 | B2 | * | 8/2014 | Ausserlechner .......... 324/207.14 |
| 2003/0071615 | A1 | * | 4/2003 | Schlicker et al. ............ 324/242 |
| 2003/0200052 | A1 | * | 10/2003 | Seiler et al. .................. 702/150 |
| 2003/0218470 | A1 | * | 11/2003 | Pulyer ................ G01R 33/3808 324/693 |
| 2004/0108854 | A1 | * | 6/2004 | Nichols ......................... 324/348 |
| 2004/0186681 | A1 | | 9/2004 | Harle |
| 2004/0232907 | A1 | * | 11/2004 | Fahrlander et al. ........ 324/207.2 |
| 2004/0263155 | A1 | * | 12/2004 | Schroeder et al. ....... 324/207.12 |
| 2005/0007101 | A1 | * | 1/2005 | Fahrlander et al. ........ 324/207.2 |
| 2005/0007102 | A1 | * | 1/2005 | Butzmann ................ 324/207.21 |
| 2007/0126418 | A1 | * | 6/2007 | Dufour et al. ............ 324/207.24 |
| 2007/0167703 | A1 | | 7/2007 | Sherman et al. |
| 2007/0242043 | A1 | * | 10/2007 | Yang et al. .................... 345/161 |
| 2008/0186197 | A1 | * | 8/2008 | Rochelle et al. .......... 340/686.6 |
| 2009/0082970 | A1 | * | 3/2009 | Andreis et al. .................... 702/8 |
| 2009/0138202 | A1 | * | 5/2009 | Tang et al. ......................... 702/7 |
| 2009/0217711 | A1 | * | 9/2009 | May ............................ 68/12.04 |
| 2009/0322325 | A1 | * | 12/2009 | Ausserlechner ............... 324/260 |
| 2010/0060640 | A1 | * | 3/2010 | Melikian et al. .............. 345/427 |
| 2010/0121579 | A1 | * | 5/2010 | Chen et al. ...................... 702/11 |
| 2010/0147038 | A1 | | 6/2010 | Dudzik et al. |
| 2010/0285606 | A1 | * | 11/2010 | Phillips et al. ................ 436/501 |
| 2010/0301217 | A1 | * | 12/2010 | Sertel et al. ................ 250/338.4 |
| 2011/0025313 | A1 | * | 2/2011 | Zangl et al. ............. 324/207.25 |
| 2011/0137628 | A1 | * | 6/2011 | Kjerstad et al. .................. 703/2 |
| 2011/0197709 | A1 | * | 8/2011 | Koriyama et al. ............ 75/10.67 |
| 2011/0210743 | A1 | * | 9/2011 | Tompkins et al. ............. 324/338 |
| 2011/0231094 | A1 | * | 9/2011 | Simon ........................... 701/213 |
| 2012/0084051 | A1 | * | 4/2012 | Hackner et al. .............. 702/153 |
| 2012/0138887 | A1 | * | 6/2012 | Zhang et al. ...................... 257/9 |
| 2012/0146627 | A1 | * | 6/2012 | Masson et al. .......... 324/207.21 |
| 2012/0153947 | A1 | * | 6/2012 | Ausserlechner ............... 324/252 |
| 2012/0326713 | A1 | * | 12/2012 | Zimmer et al. ............... 324/252 |
| 2014/0268121 | A1 | * | 9/2014 | Gastaldo et al. ........... 356/237.5 |

FOREIGN PATENT DOCUMENTS

| | | |
|---|---|---|
| DE | 20 2007 002 626 U1 | 4/2007 |
| DE | 20 2008 005 860 U1 | 7/2008 |
| DE | 10 2007 008 155 A1 | 8/2008 |
| DE | 10 2008 024 103 A1 | 11/2008 |
| EP | 0 747 662 A1 | 12/1996 |
| EP | 1450175 A2 * | 8/2004 |
| WO | WO2008141619 * | 11/2008 |

OTHER PUBLICATIONS

Young-Jae Ryoo and al., Design of Magnet Based Position Sensing for Autonomous Vehicle Robot, Sep. 28, 2004, IEEE.*
German Search Report dated Jan. 24, 2011.
International Search Report and Written Opinion dated Aug. 3, 2011.

* cited by examiner

METHOD FOR MEASURING A POSITION

CROSS REFERENCE TO RELATED APPLICATIONS

This application is a continuation of International Application No. PCT/EP2011/000624 filed Feb. 10, 2011, which designated the United States, and claims the benefit under 35 USC § 119(a)-(d) of German Application No. 10 2010 007 915.4 filed Feb. 12, 2010, the entireties of which are incorporated herein by reference.

BACKGROUND OF THE INVENTION

1. Field of the Invention

The invention relates to a method for measuring a position and a device for measuring a position.

2. Description of Related Art

Such a method can be applied as evaluating method for the three-dimensional determination of a position in a magnetically operating position sensor.

From DE 10 2008 024 103 A1, a device for measuring a position comprising a magnet and a sensor detecting the magnetic field strength of the magnet is known, wherein the magnet and/or the sensor interacts with a movable element. By means of the movable element, a relative movement between the sensor and the magnet can be effected in such a manner that the position of the movable element in accordance with the coordinates (x, y, z) in a system of coordinates can be ascertained on the basis of the magnetic field generated by the magnet and detected by the sensor. For this purpose, the sensor ascertains the components of the magnetic field strength ($B_x$, $B_y$, $B_z$) of the magnetic field, acting in the sensor at a location, or, respectively, at the same location in three linearly independent spatial directions. The magnet is selected in such a manner that it generates an analytically describable magnetic field.

SUMMARY OF THE INVENTION

The invention is based on the object of creating a method for measuring a position for such a device which operates in a simple manner.

In the method according to the invention, each coordinate x, y, z along a coordinate axis of the system of coordinates in a half-space of the magnetic field is determined individually and unambiguously by the combination of the components of the magnetic field strength ($B_x$, $B_y$, $B_z$), detected by the sensor, in all spatial directions of the system of coordinates. For determining the respective position, it is thus sufficient to measure the components of the magnetic field strengths $B_x$, $B_y$, $B_z$ at the one location in the sensor, that is to say to measure only a triple of values from which the coordinates x, y, z for the spatial position can then be calculated in a simple manner. It can thus be found that the method according to the present invention requires only little equipment expenditure and operates very rapidly.

The method for determining a position can be simplified further in that an essentially ideal dipole field is used as analytically describable magnetic field. For this purpose, a field of a cylindrical magnet having a ratio of diameter to cylinder height of about 1:1 is preferably provided since such a cylindrical magnet can be produced simply and cost-effectively. However, the field of a spherical magnet can also be used as dipole field.

The method can be developed further by describing the coordinates x, y, z from a quotient relation between the respective magnetic field strength ($B_x$, $B_y$, $B_z$), corresponding to the coordinate axis, a magnetic field value $B_0$ depending on the location, and a constant system value. In this context, the system value comprises the magnetic permeability constant and the dipole moment of the magnet. The magnetic field value $B_0$ in turn comprises a component ($B_x$, $B_y$, $B_z$) in a spatial direction and the amount of the magnetic field strength. Since these are only simple calculating steps, a low-power cost-effective microprocessor is adequate for calculating them.

In particular, the coordinates are here determined as follows:

$$x = \frac{\sqrt[3]{\frac{M_0}{B_0}}^2}{\sqrt[3]{\frac{M_0}{B_0}} \sqrt{\frac{1}{3}\left(\frac{B_z}{B_0}+1\right)}} \frac{1}{3}\frac{B_x}{B_0}$$

$$y = \frac{\sqrt[3]{\frac{M_0}{B_0}}^2}{\sqrt[3]{\frac{M_0}{B_0}} \sqrt{\frac{1}{3}\left(\frac{B_z}{B_0}+1\right)}} \frac{1}{3}\frac{B_y}{B_0}$$

$$z = \sqrt[3]{\frac{M_0}{B_0}} \sqrt{\frac{1}{3}\left(\frac{B_z}{B_0}+1\right)}$$

where $$B_0 = \frac{-B_z + \sqrt{B_z^2 + 8B^2}}{4}$$

$$B^2 = B_x^2 + B_y^2 + B_z^2$$

$$M_0 = \frac{\mu_0 p_z}{4\pi}$$

and where $p_z$ is the dipole moment of the magnet and $\mu_0$ is the permeability constant.

In some instruments in which the magnetically operating device is used for measuring a position, disturbances of the magnetic field can be produced due to the installed situation in the instrument. In such applications, the magnet thus generates a magnetic field which is distorted at least at one surface not located between the sensor and the magnet. In particular, such a surface, for example a metallic surface in the instrument, can produce shielding of the magnetic field. To guarantee a correct determination of a position even in such cases, the method for measuring a position can be designed as follows: In a first step, each coordinate x, y, z along a coordinate axis of the system of coordinates is ascertained in a half-space of an undistorted magnetic field as an initial value. In a second step, a magnetic field model of an arrangement which is plane-symmetrical, in particular mirror-like, with respect to the surface effecting the distortion, of at least two undistorted magnetic fields is described. In a third step, finally, a position determination in the magnetic field model is undertaken on the basis of the initial value by iterative combination of the components, detected by the sensor, of the magnetic field strength ($B_x$, $B_y$, $B_z$) in all spatial directions of the system of coordinates and of the magnetic field model. It can be found here, too, that this method provides for determining a position in a simple and rapid manner.

The ascertainment of each coordinate x, y, z along a coordinate axis in a half-space of an undistorted magnetic field is expediently determined as an initial value in accordance with the method described above for an undisturbed magnetic field. In a simple case, however, it may also be sufficient to select the ascertainment of each coordinate x, y, z along a coordinate axis freely in a half-space of an undistorted magnetic field as an initial value.

In a further embodiment which is characterized by a simple evaluation with regard to determining a position, the magnetic field model can be selected as a mirror-symmetrical magnetic field of two essentially ideal dipole fields mirrored at the at least one surface effecting the distortion and unilaterally pole-inverted. It is also possible for the magnetic field model to comprise an area constant for taking into consideration boundary area effects of the at least one surface effecting the distortion. For example, the area constant takes into consideration a nonideal, and thus incomplete, shielding, which is frequently present in reality, of the magnetic field by a metallic surface.

In particular, the magnetic field model can be determined as follows:

$$\vec{B} = \begin{pmatrix} B_x \\ B_y \\ B_z \end{pmatrix} = \frac{\mu_0}{4\pi} \frac{3(\vec{p} \cdot \vec{r})\vec{r} - r^2\vec{p}}{r^5} + \eta \frac{\mu_0}{4\pi} \frac{3(\vec{p} \cdot \vec{r}_s)\vec{r}_s - r_s^2\vec{p}}{r_s^5}$$

where r=(x y z) is the position vector for the magnet, $r_s$=($x_s$ $y_s$ $z_s$) is the position vector for the mirror magnet and η is the effectively active permeability of the surface effecting the distortion and of the half-space lying behind it.

A position measuring device operating in accordance with the method according to the invention can be advantageously used in a device having a metal housing. This can be, for example, a laundering machine. The machine has a housing which, in particular, consists at least partially of metal, and a rotatable drum suspended in the housing. The relative position of the drum in the housing is then determined by one of the methods described above. For example, the position measurement can be used in a washing machine for detecting the loading of the washing drum and/or for detecting the vibrational behavior of the washing drum. It is then advantageously possible to implement larger drums having a capacity of 7 or 8 kg laundry in a washing machine housing having a standard width of 60 cm. This is made possible due to the fact that the position of the drum with respect to the housing can be measured. On the basis of this signal, the washing machine control can recognize threatening impacts of the drum on the housing and respond accordingly.

The advantages achieved by means of the invention consist, in particular, in that the measuring of a position can be implemented with little expenditure and inexpensively due to the simple evaluating method. The position measurement can thus be used in cost-sensitive mass produced articles such as domestic appliances, electric tools or the like. Nevertheless, the position measurement operates very accurately and more precisely than previously and also sensitively so that it can be used in safety-critical applications, for example in motor vehicles. Finally, this is also a faster evaluating method than previously.

BRIEF DESCRIPTION OF THE DRAWINGS

Exemplary embodiments of the invention comprising various developments and embodiments are shown in the drawings and will be described in greater detail in the text which follows.

DETAILED DESCRIPTION OF THE INVENTION

Figure 1:
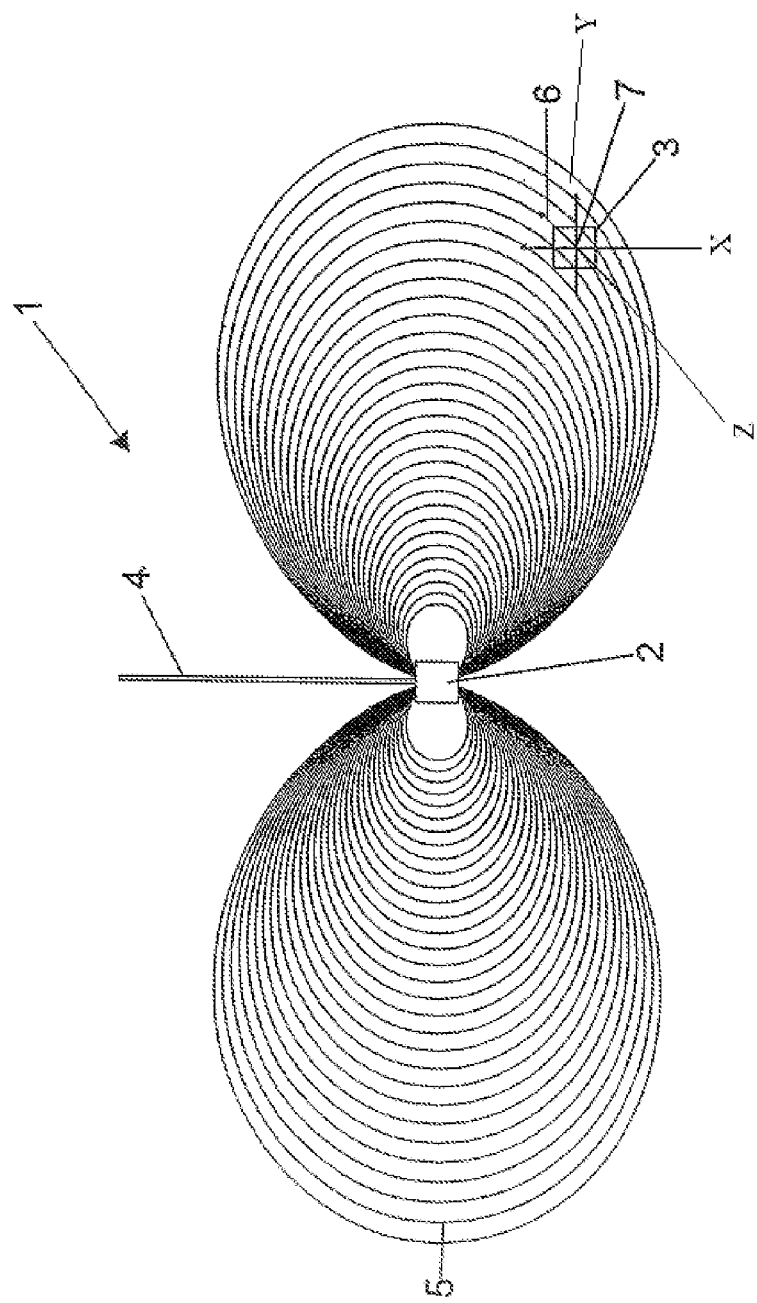
FIG. 1 diagrammatically shows a position measuring device, having a magnet and a sensor, in the manner of a schematic diagram.

In FIG. 1, used as schematic diagram, a position measuring device 1 is shown which comprises a magnet 2 and a sensor 3 detecting the magnetic field strength of the magnet 2. The magnet 2 and/or the sensor 3 interacts with a movable element 4 drawn only diagrammatically, so that a relative movement between the sensor 3 and the magnet 2 can thus be effected by means of the movable element 4. At present, the magnet 2 is arranged at the movable element 4, whereas the sensor 3 is arranged to be stationary. Naturally, the sensor 3 can also be arranged conversely at the movable element 4 and the magnet 2 can be arranged to be stationary which, however, is not considered in further detail. The magnet 2 is designed in such a manner that it generates an analytically describable magnetic field 5. As can be seen from the field lines of the magnetic field 5, drawn in FIG. 1, this is an essentially ideal dipole field, the magnetic dipole field 5 being generated by a cylindrical magnet 2 having a ratio of diameter to height of cylinder of about 1:1. The magnetic dipole field 5 can also be generated by means of a spherical magnet which, however, is not shown in further detail.

The position of the movable element 4 in accordance with coordinates x, y, z in a system of coordinates which is in this case a Cartesian system of coordinates can be ascertained on the basis of the magnetic field 5 generated by the magnet 2 and detected by sensor 3. For this purpose, the position measuring device 1 operates in accordance with the following method for measuring a position.

Firstly, the components, acting at a single, sensitive point 7 and, in consequence, at the one same location 7, of the magnetic field strength of the magnetic field 5 are ascertained in sensor 3 in three linearly independent spatial directions 6, the so-called B-field components $B_x$, $B_y$, $B_z$ as is indicated diagrammatically in FIG. 1. Each coordinate x, y, z along a coordinate axis of the system of coordinates is determined in a half-space of the magnetic field 5, this being presently the half-space located to the right of the magnet 2 in FIG. 1, individually and unambiguously by the combination of the components of the magnetic field strength $B_x$, $B_y$, $B_z$, detected by the sensor 3, in all spatial directions 6 of the system of coordinates. To determine the coordinates x, y, z, a quotient relation between the respective magnetic field strength $B_x$, $B_y$, $B_z$ corresponding to the coordinate axis, a magnetic field value $B_0$ depending on the location and a constant system value is used. The system value comprises the magnetic permeability constant or the magnetic field constant $\mu_0$, respectively, and the dipole moment $p_z$ of the magnet 2. The magnetic field value $B_0$ comprises a component $B_x$, $B_y$, $B_z$ in one spatial direction 6 and the amount of the magnetic field strength β. In particular, coordinates x, y, z can be determined with the aid of the quotient relation as follows:

$$x = \frac{\sqrt[3]{\frac{M_0}{B_0}}^2}{\sqrt[3]{\frac{M_0}{B_0}} \sqrt{\frac{1}{3}\left(\frac{B_z}{B_0} + 1\right)}} \cdot \frac{1}{3}\frac{B_x}{B_0}$$

$$y = \frac{\sqrt[3]{\frac{M_0}{B_0}}^2}{\sqrt[3]{\frac{M_0}{B_0}} \sqrt{\frac{1}{3}\left(\frac{B_z}{B_0} + 1\right)}} \cdot \frac{1}{3}\frac{B_y}{B_0}$$

$$z = \sqrt[3]{\frac{M_0}{B_0}} \sqrt{\frac{1}{3}\left(\frac{B_z}{B_0} + 1\right)}$$

where the following applies:

$$B_0 = \frac{-B_z + \sqrt{B_z^2 + 8B^2}}{4} \text{ and}$$

$$B^2 = B_x^2 + B_y^2 + B_z^2 \text{ as well as}$$

$$M_0 = \frac{\mu_0 p_z}{4\pi}$$

The formulae for determining the coordinates can be simplified still further by corresponding reformulation as follows:

$$x = \frac{\sqrt[3]{\frac{M_0}{B_0}}}{\sqrt{\frac{1}{27}\left(\frac{B_z}{B_0} + 1\right)}} \cdot \frac{B_x}{B_0} \quad (1^*)$$

$$y = \frac{\sqrt[3]{\frac{M_0}{B_0}}}{\sqrt{\frac{1}{27}\left(\frac{B_z}{B_0} + 1\right)}} \cdot \frac{B_y}{B_0} \quad (2^*)$$

$$z = \sqrt[3]{\frac{M_0}{B_0}} \cdot \sqrt{\frac{1}{3}\left(\frac{B_z}{B_0} + 1\right)} \quad (3^*)$$

Figure 2:
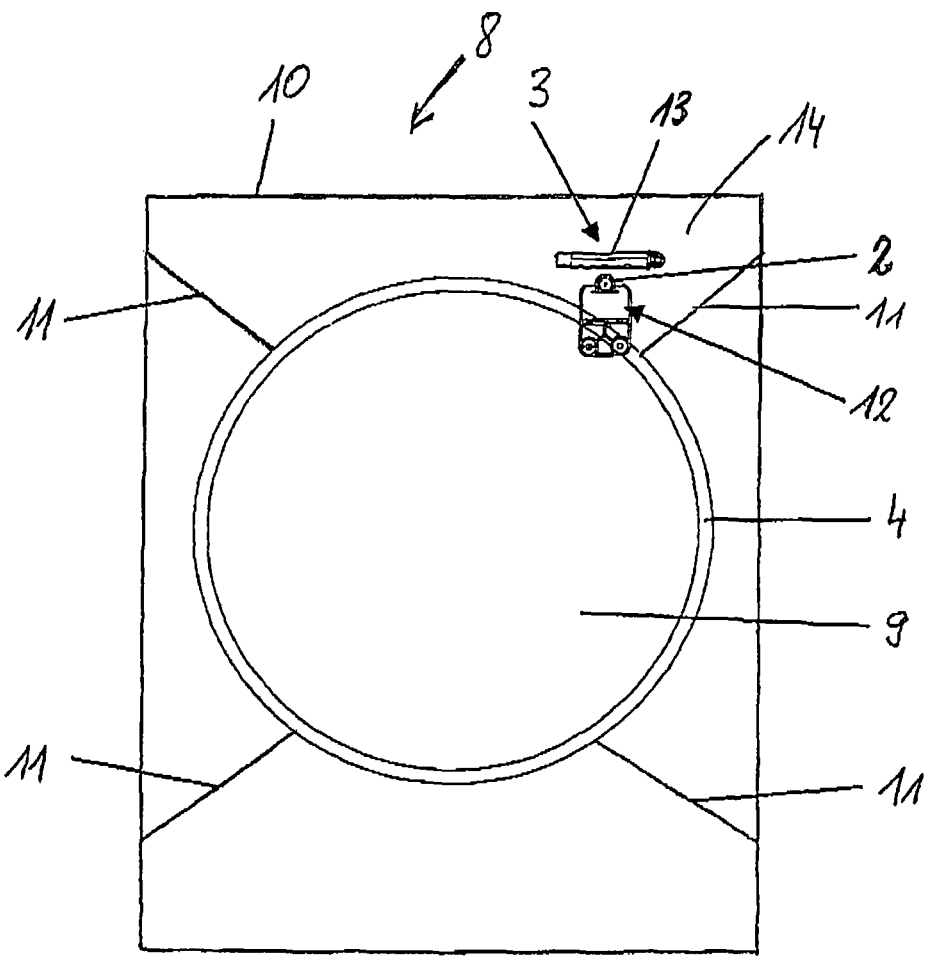
FIG. 2 diagrammatically shows a washing machine comprising a position measuring device having a magnet and a sensor.

FIG. 2 shows the use of the position measuring device 1 in a domestic appliance, namely in a laundering machine drawn only diagrammatically, for example a washing machine 8 having a housing 10. The washing machine 8 has a washing drum 9 which is supported rotatably at a bearing arrangement 4. The bearing arrangement 4 in turn is attached via suspensions 11 in the washing machine 8 in such a manner that vibrations, movements or the like of the drum 9 are transferred to the bearing arrangement 4. The bearing arrangement 4 thus represents the movable element with which the magnet 2 interacts. For this purpose, the magnet 2 is arranged in a holder 12 attached to the movable element 4. The sensor 3 has a sensor housing 13 which is fixed in the vicinity of the holder 12 and allocated to the magnet 2 at an element stationary with respect to the movable element 4 in the washing machine 9, namely at the rear housing wall 14 of the housing 10. The coordinates x, y, z, determined by the position measuring device 1, of the drum 9 are transmitted to a microcomputer in the washing machine 8 where vibrations, resonances or the like are then compensated for by means of corresponding control of the drive for the washing drum 9.

Figure 3:
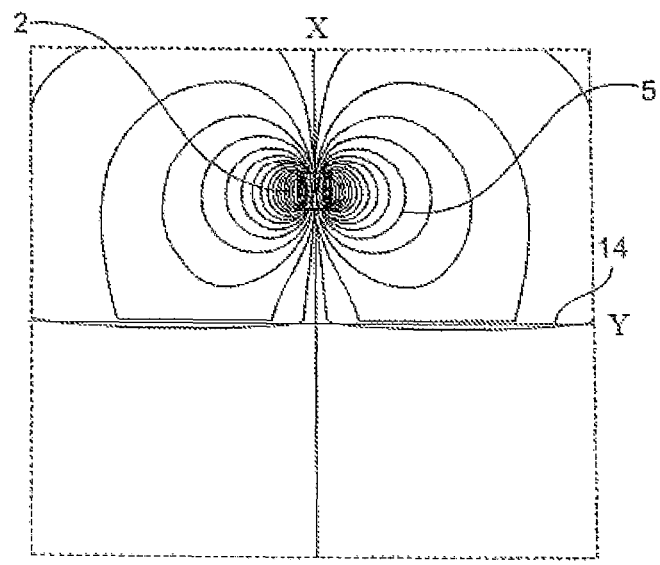
FIG. 3 shows a magnetic field distorted by a metallic surface.

The housing 10 of the washing machine 8 consists of a metal housing. However, metal causes a change in the magnetic field 5 in the manner of a shielding. Since the sensor 3 is located in the vicinity of the metallic rear housing wall 14, the magnetic field 5 generated by the magnet 2 is distorted at this at least one surface 14 not located between the sensor 3 and the magnet 2 in that the field lines of the magnet 2 are deflected at the surface 14 in such a manner that they extend largely in the surface 14 as can be seen diagrammatically in FIG. 3. In order to take into consideration this effect, the method for measuring a position comprising the magnet 2 and the sensor 3 detecting the magnetic field strength, that is to say the determination of the relative position of drum 9 in the housing 10, is extended as follows.

In a first step, each coordinate x, y, z along a coordinate axis 6 of the system of coordinates in a half-space of an undistorted magnetic field 5 is assigned an initial value $x_0$, $y_0$, $z_0$. The ascertainment of each coordinate x, y, z is preferably effected along a coordinate axis 6 in the half-space of an undistorted magnetic field 5 as an initial value $x_0$, $y_0$, $z_0$ in accordance with the above formulae (1*), (2*) and (3*) in accordance with the method for determining a position for an undisturbed magnetic field 5. On the other hand, it is also possible to select the ascertainment of each coordinate x, y, z along a coordinate axis 6 in the half-space of an undistorted magnetic field 5 freely in a suitable manner as an initial value $x_0$, $y_0$, $z_0$.

Figure 4:
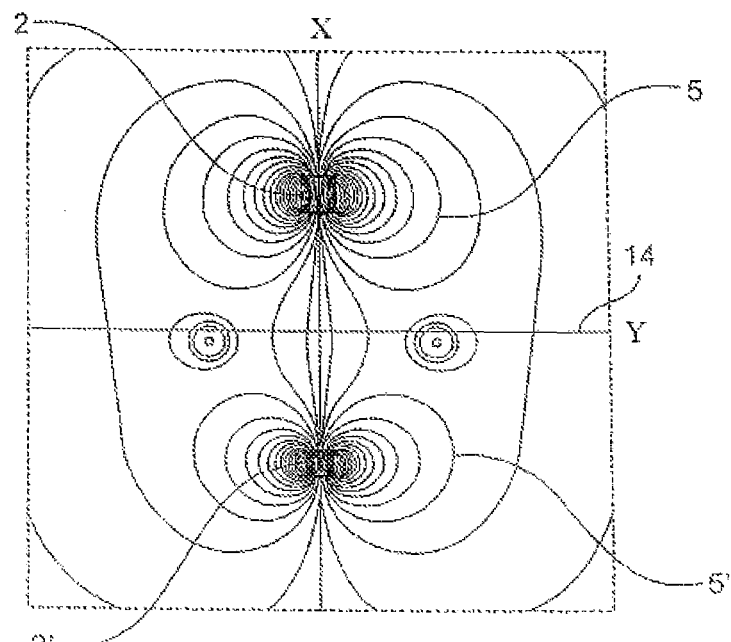
FIG. 4 shows a magnetic field model taking into consideration the distortion at a metallic surface.

In a second step, a magnetic field model of a plane-symmetrical, in particular mirror-like arrangement with respect to the surface 14 causing the distortion, of at least two undistorted magnetic fields 5, 5' is described as is shown in FIG. 4. This magnetic field model expediently contains a mirror-symmetrical magnetic field 5, 5', the magnetic field 5 being generated by the magnet 2 and the magnetic field 5' being generated by a similar mirror magnet 2' with respect to the surface 14. The magnetic fields 5, 5' as shown in FIG. 4 are thus two essentially ideal dipole fields which are mirrored at the at least one surface 14 causing the distortion and are unilaterally pole-inverted. The magnetic field model can also comprise an area constant η which is used for taking into consideration boundary area effects of the at least one surface 14 causing the distortion. For example, the area constant takes into account the fact that the real metal of the rear housing wall 14 is not an ideal "magnetic conductor". In other words, it is taken into consideration that, in the real case of the rear housing wall 14, a certain proportion of the magnetic field lines also extends outside the rear housing wall 14, as a result of which η represents the effectively active permeability of the rear housing wall.

In a third step, finally, the actual determination of a position occurs in this magnetic field model. This is determined, starting from the initial value $x_0$, $y_0$, $z_0$, by iterative combination of the components, detected by the sensor 3, of the magnetic field strength $B_x$, $B_y$, $B_z$ in all spatial directions 6 of the system of coordinates and of the magnetic field model. In other words, the initial value $x_0$, $y_0$, $z_0$ is firstly inserted into the magnetic field model and from this a first approximate value $x_1$, $y_1$, $z_1$ is determined. This first approximate value is subsequently in turn inserted into the magnetic field model and from this a second approximate value $x_2$, $y_2$, $z_2$ is determined. The iteration is then continued until two successive approximation values $x_{n-1}$, $y_{n-1}$, $z_{n-1}$ and $x_n$, $y_n$, $z_n$ are approximately equal for the position, that is to say, for example, until $$|x_{n-1} - x_n| \leq \epsilon$$

$$|y_{n-1} - y_n| \leq \epsilon$$

$$|z_{n-1} - z_n| \leq \epsilon$$

holds true, where ϵ is a predetermined barrier determining the required accuracy of the evaluating method.

In particular, the magnetic field model consisting of the arrangement of magnet 2 and mirror magnet 2' according to FIG. 4 can be determined as follows:

$$\vec{B} = \begin{pmatrix} B_x \\ B_y \\ B_z \end{pmatrix} = \frac{\mu_0}{4\pi} \frac{3(\vec{p} \cdot \vec{r})\vec{r} - r^2 \vec{p}}{r^5} + \eta \frac{\mu_0}{4\pi} \frac{3(\vec{p} \cdot \vec{r}_S)\vec{r}_S - r_S^2 \vec{p}}{r_S^5}$$

Here, r=(x y z) is the position vector for magnet 2, $r_s = (x_s, y_s, z_s)$ is the position vector for the mirror magnet 2' and η is the effectively active permeability of the surface 14 causing the distortion and of the half-space lying behind it. As has been found, the value for η is approximately 0.7 in the usual materials for the rear housing wall 14 in a washing machine 8.

The invention is not restricted to the exemplary embodiments described and represented. Instead, it comprises also all technical developments within the context of the invention defined by the patent claims. Thus, the method for measuring a position can also be used, apart from in other domestic appliances, in motor vehicles, for example in motor vehicle locks, for chassis identification, for multimedia operating elements or the like. In addition, this measuring method offers many other possible applications for the general recognition of position in production and automation technology.

LIST OF DESIGNATIONS

1: Position measuring device
2: Magnet/cylindrical magnet
2': Mirror magnet
3: Sensor
4: Movable element/bearing arrangement
5: Magnetic field/magnetic dipole field/dipole field
5': (mirror-symmetrical) magnetic field/dipole field
6: Spatial direction/co-ordinate axis
7: Location (in sensor)/sensitive point
8: Washing machine
9: Washing drum/drum
10: Housing (of washing machine)
11: Suspension
12: Holder (for magnet)
13: Sensor housing
14: Rear housing wall/surface

The invention claimed is:

1. A method used in an apparatus for measuring a position of a movable element supported in the apparatus, the method comprising:
   providing a position measuring device comprising a generally cylindrical magnet or a generally spherical magnet, and a sensor, at least one of the generally cylindrical magnet or the generally spherical magnet, and the sensor, being adapted to interact with the movable element,
   generating a magnetic field with the generally cylindrical magnet or the generally spherical magnet, the magnetic field having a magnetic field strength,
   interacting the one of the generally cylindrical magnet or the generally spherical magnet, and the sensor, with the movable element,
   detecting and measuring, with the sensor, the magnetic field strength of the generally cylindrical magnet or the generally spherical magnet during the interacting of the movable element with the one of the generally cylindrical magnet or the generally spherical magnet, and the sensor, and
   detecting and measuring the position of the movable element by the sensor with coordinates (x, y, z) in a system of coordinates ascertained on a basis of the magnetic field generated by the generally cylindrical magnet or the generally spherical magnet,
   wherein the magnetic field generated by the generally cylindrical magnet or the generally spherical magnet has a predetermined shape, and the sensor ascertains three linearly independent spatial direction components of the magnetic field strength ($B_x$, $B_y$, $B_z$) acting at a location of the sensor,
   wherein each of the coordinates x, y, z along a coordinate axis of the system of coordinates of the magnetic field is determined individually and unambiguously by a combination of the three linearly independent spatial direction components of the magnetic field strength ($B_x$, $B_y$, $B_z$) detected by the sensor in the system of coordinates,
   wherein the generally cylindrical magnet or the generally spherical magnet generates the magnetic field in which a portion of the magnetic field is distorted at a surface not located between the sensor and the generally cylindrical magnet or the generally spherical magnet,
   ascertaining each coordinate x, y, z along a coordinate axis of the system of coordinates of the magnetic field as an initial value ($x_0$, $y_0$, $z_0$); and
   transmitting the coordinates x, y, z from the position measuring device to a microcomputer in the apparatus, the microcomputer using non-transitory computer-readable media to compensate for at least one of vibration and resonance in the apparatus by controlling a drive of the apparatus.

2. The method for measuring a position as claimed in claim 1, wherein the generally cylindrical magnet or the generally spherical magnet has a ratio of diameter to height of about 1:1, and the predetermined shape of the magnetic field is an essentially ideal dipole field.

3. The method for measuring a position as claimed in claim 2, wherein the essentially ideal dipole magnetic field is a magnetic field of a cylindrical magnet having a ratio of diameter to cylinder height of approximately 1:1.

4. The method for measuring a position as claimed in claim 2, wherein the essentially ideal dipole magnetic field is a magnetic field of a spherical magnet.

5. An apparatus comprising a housing and the movable element, the movable element comprising a rotatable drum suspended in the housing, wherein the relative position of the drum in the housing is determined by the method of claim 1.

6. The method for measuring a position as claimed in claim 5, wherein the housing is a metal housing.

7. The method for measuring a position as claimed in claim 5, wherein the apparatus is a laundering machine.

8. The method for measuring a position as claimed in claim 1, wherein the system of coordinates are Cartesian coordinates.

9. The method for measuring a position as claimed in claim 1, wherein at least one of the magnet and the sensor is fixed to a stationary member.

10. The method for measuring a position as claimed in claim 1, wherein at least one of the generally spherical magnet or the generally cylindrical magnet is arranged at the movable element and the sensor is arranged to be stationary, and the sensor is arranged at the movable element and the generally spherical magnet or the generally cylindrical magnet and the sensor is arranged to be stationary.

11. A method used in an apparatus for measuring a position of a movable element supported in the apparatus, the method comprising:
providing a position measuring device comprising a generally cylindrical magnet or a generally spherical magnet and a sensor, at least one of the generally cylindrical magnet or the generally spherical magnet and the sensor being configured to interact with the movable element,
generating a magnetic field with the generally cylindrical magnet or the generally spherical magnet, the magnetic field having a magnetic field strength,
interacting the at least one of the generally cylindrical magnet or the generally spherical magnet and the sensor with the movable element,
detecting and measuring, with the sensor, the magnetic field strength of the generally cylindrical magnet or the generally spherical magnet during relative movement between the at least one of the generally cylindrical magnet or the generally spherical magnet and the sensor effected by the movable element, and
detecting and measuring the position of the movable element by the sensor with coordinates (x, y, z) in a system of coordinates ascertained on the basis of the magnetic field generated by the generally cylindrical magnet or the generally spherical magnet, and
transmitting the coordinates x, y, z from the position measuring device to a microcomputer in the apparatus, the microcomputer using non-transitory computer-readable media to compensate for at least one of vibration and resonance in the apparatus by controlling a drive of the apparatus,
wherein the magnetic field generated by the generally cylindrical magnet or the generally spherical magnet has a predetermined shape, and the sensor ascertains three linearly independent spatial direction components of the magnetic field strength ($B_x$, $B_y$, $B_z$) acting at a location of the sensor,
wherein each of the coordinates x, y, z along a coordinate axis of the system of coordinates of the magnetic field is detected individually and unambiguously by a combination of the three linearly independent spatial direction components of the magnetic field strength ($B_x$, $B_y$, $B_z$) detected by the sensor in the system of coordinates, and
wherein the coordinates (x, y, z) are defined by a quotient relation between the three linearly independent spatial direction components of the magnetic field strength ($B_x$, $B_y$, $B_z$) corresponding to the coordinate axes, a magnetic field value $B_0$ depending on the location, and a constant system value, wherein the system value comprises a magnetic permeability constant and a dipole moment of the magnet and the magnetic field value $B_0$ comprises one of the three linearly independent spatial direction components of the magnetic field strength ($B_x$, $B_y$, $B_z$) and the amount of the magnetic field strength in that spatial direction with the coordinates being determined as follows:

$$x = \frac{\sqrt[3]{\frac{M_0}{B_0}}^2}{\sqrt[3]{\frac{M_0}{B_0}}\sqrt{\frac{1}{3}\left(\frac{B_z}{B_0}+1\right)}} \frac{1}{3}\frac{B_x}{B_0}$$

$$y = \frac{\sqrt[3]{\frac{M_0}{B_0}}^2}{\sqrt[3]{\frac{M_0}{B_0}}\sqrt{\frac{1}{3}\left(\frac{B_z}{B_0}+1\right)}} \frac{1}{3}\frac{B_y}{B_0}$$

$$z = \sqrt[3]{\frac{M_0}{B_0}}\sqrt{\frac{1}{3}\left(\frac{B_z}{B_0}+1\right)}$$

where $$B_0 = \frac{-B_z + \sqrt{B_z^2 + 8B^2}}{4}$$

$$B^2 = B_x^2 + B_y^2 + B_z^2$$

$$M_0 = \frac{\mu_0 p_z}{4\pi}$$

and where $p_z$ is the dipole moment of the generally spherical magnet and $\mu_0$ is the permeability constant.

12. A method used in an apparatus for measuring a position of a movable element supported in the apparatus, the method comprising:
providing a position measuring device comprising at least a mirror magnet, and a sensor, at least one of the at least the mirror magnet and the sensor being adapted to interact with the movable element,
generating a magnetic field with the at least the mirror magnet, the magnetic field having a magnetic field strength;
interacting the one of the at least the mirror magnet and the sensor with the movable element,
detecting and measuring, with the sensor, the magnetic field strength of the at least the mirror magnet during the interacting of the at least the mirror magnet and the sensor with the movable element,
wherein the relative movement between the sensor and the at least the mirror magnet is effected by means of the movable element, in such a manner that a position of the movable element is detected and measured by the sensor with coordinates (x, y, z) in a system of coordinates ascertained by means of the magnetic field generated by the at least the mirror magnet, and detected by the sensor,
wherein the magnetic field generated by the at least the mirror magnet includes a portion of the magnetic field which is distorted at a surface not located between the sensor and the at least the mirror magnet,
wherein the sensor ascertains three linearly independent spatial direction components of the magnetic field strength ($B_x$, $B_y$, $B_z$) acting at a location of the sensor,
wherein, in a first step, ascertaining each coordinate x, y, z along a coordinate axis of the system of coordinates of an undistorted magnetic field as an initial value ($x_0$, $y_0$, $z_0$), in a second step, inserting a magnetic field model of an undistorted magnetic field arrangement which is plane-symmetrical with respect to the surface effecting the distortion to replace the portion of the magnetic field that is distorted, and in a third step, determining a position of the movable element in the magnetic field model on the basis of the initial value ($x_0$, $y_0$, $z_0$) by iterative combination of the three linearly independent spatial direction components of the magnetic field strength ($B_x$, $B_y$, $B_z$) in the system of coordinates using the magnetic field model, and wherein the position measuring device transmits the coordinates x, y, z to a microcomputer in the apparatus, the microcomputer using non-transitory computer readable media to compensate for at least one of vibration and resonance in the apparatus by controlling a drive of the apparatus.

13. The method for measuring a position as claimed in claim 12, wherein ascertaining each coordinate x, y, z along the coordinate axis in the undistorted magnetic field of the magnet is freely selected as the initial value $(x_0, y_0, Z_0)$.

14. The method for measuring a position as claimed in claim 12, wherein ascertaining each coordinate x, y, z along the coordinate axis in a half-space the undistorted magnetic field of the mirror magnet is determined as the initial value $(x_0, y_0, z_0)$.

15. The method for measuring a position as claimed in claim 12, wherein the magnetic field model is a mirror-symmetrical magnetic field of two essentially ideal dipole fields mirrored at the at least one surface effecting the distortion and unilaterally pole-inverted.

16. The method for measuring a position as claimed in claim 12, wherein the magnetic field model comprises an area constant ($\eta$) for taking into consideration boundary area effects of the at least one surface effecting the distortion.

17. The method for measuring a position as claimed in claim 12, wherein the magnetic field model is determined as follows:

$$\vec{B} = \begin{pmatrix} B_x \\ B_y \\ B_z \end{pmatrix} = \frac{\mu_0}{4\pi} \frac{3(\vec{p}\cdot\vec{r})\vec{r} - r^2\vec{p}}{r^5} + \eta \frac{\mu_0}{4\pi} \frac{3(\vec{p}\cdot\vec{r}_S)\vec{r}_S - r_S^2\vec{p}}{r_S^5}$$

wherein $r=(x\ y\ z)$ is the position vector for a generally cylindrical magnet, $r_s=(x_s\ y_s\ z_s)$ is the position vector for the at least the mirror magnet and $\eta$ is the effectively active permeability of the surface effecting the distortion and a space lying behind the surface effecting the distortion.

18. The method for measuring a position as claimed in claim 12, wherein the magnetic field is shielded by the surface effecting the distortion.

19. The method for measuring a position as claimed in claim 12, wherein the plane-symmetrical magnetic field model of the arrangement is mirror-like.

20. The method for measuring a position as claimed in claim 12, wherein the portion of the magnetic field which is distorted includes field lines of the generally spherical magnet or the generally cylindrical magnet extending on the surface.

* * * * *